UNITED STATES PATENT OFFICE.

EDWARD P. EASTWICK, OF NEW YORK, N. Y., AND ORAZIO LUGO, OF JERSEY CITY, NEW JERSEY; SAID LUGO ASSIGNOR TO SAID EASTWICK.

IMPROVEMENT IN YEAST-POWDERS.

Specification forming part of Letters Patent No. 150,845, dated May 12, 1874; application filed May 7, 1874.

*To all whom it may concern:*

Be it known that we, EDWARD P. EASTWICK, of the city, county, and State of New York, and ORAZIO LUGO, a naturalized citizen of the United States, and now a resident of Jersey City, in the State of New Jersey, have jointly invented a certain Improvement in the Manufacture of Yeast-Powders, of which the following is a specification:

This invention relates to a new and useful improvement in the manufacture of yeast-powders, hereinafter more fully set forth and described.

The nature of our invention consists in the manufacture of a very superior and new and useful compound to be used in connection with any kind of flour or amylaceous matters intended for culinary purposes.

The said compound or mixture is composed of neutral and acid salts, in such proportions and for the purpose hereinafter more fully specified.

In order to enable others to understand and apply our invention, we will proceed to describe the same.

The chemicals which may be used are the carbonates (acid or neutral) of the alkalies and alkaline earths—soda, potassa, ammonia, lime, &c.—and the neutral, or acid, or double sulphates of alumina, (alums,) or any other salts, which, by their decomposition, precipitate alumina, and by which alums may be formed, and sulphates (of the carbonate used) and free carbonic-acid gas are produced.

A mixture of two or more carbonates and a sulphate, or other salts of alumina can be used, and will give a similar reaction as when only one carbonate is used.

We will, however, describe more particularly one of the mixtures of the salts, which, when mixed with water, and heat applied by their mutual decomposition, develop a large quantity of carbonic-acid gas, such as the normal sulphate of alumina and the acid carbonate of soda, in which mixture the following formula illustrates the chemical reaction: $Al_2O_3,3SO_3,18HO + 3(NaO,2CO_2,HO) + 9HO = 3(NaO,SO_3,10HO) + Al_2O_3 + 6CO_2$.

The above formula expresses the chemical equivalents requisite for the reaction, but in using such compounds it is often necessary to change the proportions of the different salts in order to obtain certain desirable results, to wit, either an alkaline neutral or acid reaction, as may be desired.

We have made a good and well-raised bread, also cakes, &c., with the following amounts: One hundred and fifty parts of sulphate of alumina, eighty parts of bicarbonate of soda, one hundred parts of chloride of sodium, one hundred parts of sugar, one hundred and seventy parts of flour—total, six hundred parts.

The above was well mixed and added to seven thousand and eighty parts of flour; but we do not confine ourselves to this proportion (7080) of flour. The same can be varied to suit the tastes and requirements of those using the same—a smaller quantity of flour used giving lighter bread, and a larger quantity a closer or not so highly aerated a bread.

In mixing the salts we proceed as follows: We mix separately the one hundred and fifty parts of sulphate of alumina with about one-half of the one hundred and seventy parts of flour, and the eighty parts of bicarbonate of soda with the other half. Then we mix the whole of the six hundred parts together, and when properly incorporated, add the mixture to the seven thousand and eighty parts of flour, or thereabout.

The above may be used as a prepared flour of a self-raising character.

When we desire to make yeast-powders to be used for culinary purposes we take about one hundred and fifty parts of sulphate of alumina, and eighty parts of bicarbonate of soda; or we take about one hundred and fifty parts of sulphate of alumina, eighty parts of bicarbonate of soda, one hundred and twenty parts of chloride of sodium, one hundred parts of sugar, and one hundred parts of flour; or, we take about six hundred and forty parts sulphate of alumina, four hundred and forty parts of bicarbonate of soda, and four hundred and twenty parts of flour.

We do not claim as our invention prepared flour, or self-raising flour, nor the invention of yeast-powders; but

We claim as our invention, and as a new article of manufacture—

1. The yeast-powders, hereinbefore described, prepared with or containing salts of aluminium, either with or without flour, chloride of sodium, or sugar, substantially and for the purposes within described.

2. The combination of salts of alumina and the carbonates of the alkalies or alkaline earth, or both, either with or without flour, chloride of sodium, or sugar, substantially and for the purposes within described.

EDWD. P. EASTWICK.
ORAZIO LUGO.

Witnesses:
  CHS. FLEURY,
  GEO. S. EASTWICK.